United States Patent
Funada et al.

(10) Patent No.: US 6,172,783 B1
(45) Date of Patent: Jan. 9, 2001

(54) OPTICAL BUS AND SIGNAL PROCESSOR

(75) Inventors: Masao Funada; Masaki Hirota; Junji Okada; Kazuhiro Sakai; Takekazu Shiotani; Tsutomu Hamada; Takashi Ozawa, all of Nakai-machi (JP)

(73) Assignee: Fuji Xerox Co., Ltd., Tokyo (JP)

( * ) Notice: Under 35 U.S.C. 154(b), the term of this patent shall be extended for 0 days.

(21) Appl. No.: 08/954,660

(22) Filed: Oct. 20, 1997

(30) Foreign Application Priority Data

Oct. 24, 1996 (JP) .................................................... 8-282629

(51) Int. Cl.[7] ............................. H04B 10/00; H04B 10/10
(52) U.S. Cl. ............................................ 359/163; 359/159
(58) Field of Search ..................................... 359/163, 159

(56) References Cited

U.S. PATENT DOCUMENTS

| | | | |
|---|---|---|---|
| 4,499,608 | * | 2/1985 | Broockman ............................ 455/607 |
| 4,673,241 | * | 6/1987 | Nishiwaki et al. ................... 350/3.64 |
| 5,500,523 | * | 3/1996 | Hamanaka ............................ 250/216 |
| 5,822,475 | * | 10/1998 | Hirota ..................................... 385/24 |
| 5,861,968 | * | 1/1999 | Kerklaan ............................... 359/152 |

FOREIGN PATENT DOCUMENTS

| | | |
|---|---|---|
| 61-196210 | 8/1986 | (JP) . |
| 2-41042 | 2/1990 | (JP) . |
| 8-15539 | 1/1996 | (JP) . |
| 8-5852 | 1/1996 | (JP) . |

OTHER PUBLICATIONS

"The Lecture Meeting of Circuit Packaging Technology", Teiji Uchida, 15C01, pp. 201–202.
"Packaging Technology for Optical Interconnects", H. Tomimuro et al., IEEE Tokyo No. 33, pp. 81–86, 1994.
"Board–to–Board Optical Interconnection Using Multiple Wavelengths and Stacked High Reflection Plates", C. An et al., Optics, vol. 24, No. 9, Sep., 1995, pp. 574(50)–580(56).
"Architecture of Fast Fourier Transform Special–Purpose Computer Using Wavelength–Multiplexed Optical Interconnection", C. An et al., Optics, vol. 25, No. 6, 1996, pp. 337(43)–344(50).

* cited by examiner

*Primary Examiner*—Leslie Pascal
*Assistant Examiner*—Agustin Bello
(74) *Attorney, Agent, or Firm*—Oliff & Berridge, PLC

(57) ABSTRACT

An optical bus for propagating signal light comprises a beam dividing portion consisting of a plurality of diffraction surfaces for diffracting signal light input from a signal light input portion and directing it toward a plurality of signal light output portions, which are arranged in a mosaic manner. A signal processor uses the above optical bus to carry out signal processing including the transmission and reception of a signal to improve optical energy use efficiency, thereby reducing power consumption and constructing a system having extendability.

12 Claims, 13 Drawing Sheets

OPTICAL BUS AND SIGNAL PROCESSOR

BACKGROUND OF THE INVENTION

1. Field of the Invention

The present invention relates to an optical bus for propagating signal light and to a signal processor for carrying out signal processing including the transmission and reception of a signal using the optical bus.

2. Related Art

The number of circuit functions of a circuit board (daughter board) used in a data processing system has been greatly increasing due to the development of a very-large-scale integrated circuit (VLSI). Since the number of signals connected to each circuit board grows along with an increase in the number of circuit functions, parallel architecture which requires large numbers of connectors and connection lines is now being employed in a data bus board (mother board) for connecting the circuit boards (daughter boards) using a bus structure. Although the operation speed of a parallel bus has been improved by promoting the parallel architecture by using the multilayer structure of connection lines and reducing the width of each connection line, the processing speed of a system may be limited by the operation speed of the parallel bus due to a signal delay caused by capacity between connection lines and connection line resistance. An electromagnetic interference (EMI) problem caused by an increase in the density of connection lines of a parallel bus is a great restriction on the improvement of the operation speed of the system.

In recent years, optical communication has been making quick progress and demand for an optical branching unit which is a key device for communication has been increasing each year. However, the biggest problem of optical communication is that the cost of this key device and its packaging cost are extremely high. The cause of boosting the packaging cost is that extremely high optical positioning accuracy is required for the device for optical communication.

To solve the above problem and improve the operation speed of a parallel bus, use of intra-system optical connection technology called "optical interconnection" has been studied. As is outlined in Teiji Uchida, "the Lecture Meeting of Circuit Packaging Technology", 15C01, pp.201–202 and H. Tomimuro et al., "Packaging Technology for Optical Interconnects", IEEE Tokyo No. 33, pp.81–86, 1994, various optical interconnection technologies have been proposed according to the configuration of a system.

Out of the optical interconnection technologies which have been proposed heretofore, Japanese Published Unexamined Patent Application No. Hei 2-41042 discloses the application of an optical data transmission system which uses high-speed and high-sensitivity light emitting and light receiving devices to a data bus. This application proposes a serial optical data bus for loop transmission between circuit boards in which light emitting and light receiving devices are arranged on both front and rear sides of each circuit board and the light emitting and light receiving devices on adjacent circuit boards incorporated in a system frame are spatially interconnected by light. In this system, signal light transmitted from one circuit board is converted into an electric signal by a circuit board adjacent to the circuit board and further converted into an optical signal by the circuit board, and the converted optical signal is then transmitted to the next adjacent circuit board. Thus, the circuit boards are arranged in series and opto-electric and electro-optical conversions are repeated on each circuit board so that signal light is transmitted to all the circuit boards incorporated in the system frame. Therefore, the signal transmission speed depends on and is restricted by the opto-electric and electric-optical conversion speeds of the light emitting and light receiving devices arranged on each circuit board. Since optical interconnection of light emitting and light receiving devices arranged on each circuit board with a free space interposed therebetween is used for data transmission between the circuit boards, optical positioning of the light emitting/light receiving devices arranged on both front and rear sides of adjacent circuit boards must be carried out to optically interconnect all the circuit boards. Further, as the circuit boards are interconnected with a free space interposed therebetween, a data transmission failure might be caused by the occurrence of an interference (crosstalk) between adjacent optical data transmission lines. Further, a data transmission failure might also be caused by the diffusion of signal light by an environment within the system frame, for example, dust. Since the circuit boards are arranged in series, when any one of the boards is removed, interconnection is disconnected and an extra circuit board is required to compensate for the removed board. In other words, the circuit boards cannot be removed freely and the number of circuit boards is fixed.

Other data transmission technology between circuit boards is disclosed in Japanese Published Unexamined Patent Application No. Sho 61-196210. The technology disclosed herein is a system for optically connecting circuit boards through an optical path constituted by diffraction gratings and reflection elements arranged on the front surface of a plate having two parallel surfaces. However, this system has various problems: since light emitted from one point can be connected to only one fixed point, all the circuit boards cannot be interconnected unlike an electric bus; a data transmission failure might be caused by an interference (crosstalk) between adjacent optical data transmission lines due to a positional difference between optical elements as positioning is very difficult; and a circuit board cannot be removed freely because information on connection between circuit boards is determined by diffraction gratings and reflection elements arranged on the front surface of the plate, resulting in low extendability.

Japanese Published Unexamined Patent Application Nos. Hei 8-15539 and Hei 8-5852 propose optical branching units all of which require interconnection (packaging) having high positioning accuracy. For instance, in Japanese Published Unexamined Patent Application No. Hei 8-5852, when there is a positional difference of 4 $\mu$m, signal light attenuates by −4 dB. Thus, as requirement for positioning accuracy is extremely high, packaging costs become huge, thereby retarding the popularization of the optical branching unit.

As means for solving these problems, there has been proposed a system in which circuit boards are arranged around a transparent optical transmission plate and optical signals are transmitted and received through the optical transmission plate, that is, using the optical transmission plate as an optical bus (refer to "Optics", Vol. 24, No. 9, September, 1995, pp. 574(50)–580 (56), "Board-to-Board Optical Interconnection Using Multiple Wavelengths and Stacked High Reflection Plates", C. An, T. Minemoto and "Optics", Vol.25, No. 6, 1996, pp. 337(43)–344 (50), "Architecture of Fast Fourier Transform Special-Purpose Computer Using Wavelength-Multiplexed Optical Interconnection", C. An, T. Minemoto).

However, when the optical transmission plate (optical bus) is used, light incident upon the optical transmission plate spreads to a wide range and not only to a signal light output portion for picking up the light. Therefore, optical energy use efficiency is low and there remains a problem to be solved to increase speed and reduce power consumption. Therefore, in the above system, signal light is enclosed inside by making highly reflective end surface portions excluding the signal light input portion and signal light output portion of the optical transmission plate. However, the optical energy use efficiency is improved to a certain degree but has its limits.

SUMMARY OF THE INVENTION

In view of the above circumstances, it is an object of the present invention to provide an optical bus having high optical energy efficiency and a signal processor which uses the optical bus to increase the extendibility of a system and reduce power consumption.

The optical bus for propagating signal light of the present invention which attains the above object comprises:

(1-1) a signal light input portion for inputting signal light;

(1-2) a plurality of signal light output portions for outputting signal light;

(1-3) a beam dividing portion for dividing signal light input from the signal light input portion into a plurality of rays and directing them toward the plurality of signal light output portions.

In the above optical bus of the present invention, it is preferred that the beam dividing portion (1-3) should consist of a plurality of unit optical elements, each for directing signal light input from the signal light input portion toward any one of the plurality of signal light output portions and should divide signal light input from the signal light input portion into a plurality of rays spatially and direct them toward the plurality of signal light output portions as a whole.

In this case, it is more preferred that the above beam dividing portion should consist of a plurality of unit optical elements for directing the signal light input from the signal light input portion toward different signal light output portions out of the plurality of signal light output portions, which are arranged adjacent to one another.

This beam dividing portion may consist of reflection bodies, each for reflecting signal light input from the signal light input portion and directing it toward any one of the plurality of signal light output portions, as the unit optical elements.

Or this beam dividing portion may consist of refraction bodies, each for refracting signal light input from the signal light input portion and directing it toward any one of the plurality of signal light output portions, as the unit optical elements.

Or this beam dividing portion may consist of diffraction bodies, each for diffracting signal light input from the signal light input portion and directing it toward any one of the plurality of signal light output portions, as the unit optical elements.

The signal processor of the present invention which attains the above object comprises:

(2-1) a substrate;

(2-2) a plurality of circuit boards, each mounting at least one pair out of a pair of a signal light output end for outputting signal light and an electric circuit for generating a signal to be carried by signal light output from the signal light output end and a pair of a signal light input end for inputting signal light and an electronic circuit for carrying out signal processing based on the signal to be carried by the signal light input from the signal light input end;

(2-3) an optical bus, fixed to the substrate, for propagating signal light input from a signal light input portion, which comprises the signal light input portion for inputting signal light, a plurality of signal light output portions for outputting the signal light, and a beam dividing portion for dividing a beam of signal light input from the signal light input portion into a plurality of rays and directing them toward the plurality of signal light output portions; and (2-4) circuit board bases for fixing the circuit boards to the substrate in such a manner that the signal light output end of each circuit board having a signal light output end is optically connected to the signal light input portion of the optical bus and the signal light input end of each circuit board having a signal light input end is optically connected to the signal light output portion of the optical bus.

In the above signal processor of the present invention, it is preferred that the beam dividing portion of the optical bus (2-3) should consist of a plurality of unit optical elements for directing signal light input from the signal light input portion of the optical bus toward any one of a plurality of the signal light output portions of the optical bus and should divide signal light input from the signal light input portion of the optical bus into a plurality of rays spatially and direct them toward a plurality of the signal light output portions of the optical bus as a whole.

In this case, it is more preferred that the above beam dividing portion of the above optical bus should consist of a plurality of unit optical elements for directing the signal light input from the signal light input portion of the optical bus toward different signal light output portions out of the plurality of signal light output portions of the optical bus, which are arranged adjacent to one another.

The beam dividing portion of the optical bus may consist of reflection bodies, each for reflecting signal light input from the signal light input portion of the optical bus and directing it toward any one of the plurality of signal light output portions of the optical bus, as the unit optical elements.

Or the beam dividing portion of the optical bus may consist of refraction bodies, each for refracting signal light input from the signal light input portion of the optical bus and directing it toward any one of a plurality of the signal light output portions of the optical bus, as the unit optical elements.

Or the beam dividing portion of the optical bus may consist of diffraction bodies, each for diffracting signal light input from the signal light input portion of the optical bus and directing it toward any one of a plurality of the signal light output portions of the optical bus, as the unit optical elements.

BRIEF DESCRIPTION OF THE ACCOMPANYING DRAWINGS

The above and other objects and advantages of the present invention will become apparent from the following description with reference to the accompanying drawing, wherein.

DETAILED DESCRIPTION OF THE PREFERRED EMBODIMENTS

Preferred embodiments of the present invention are described hereinunder.

Figure 1:
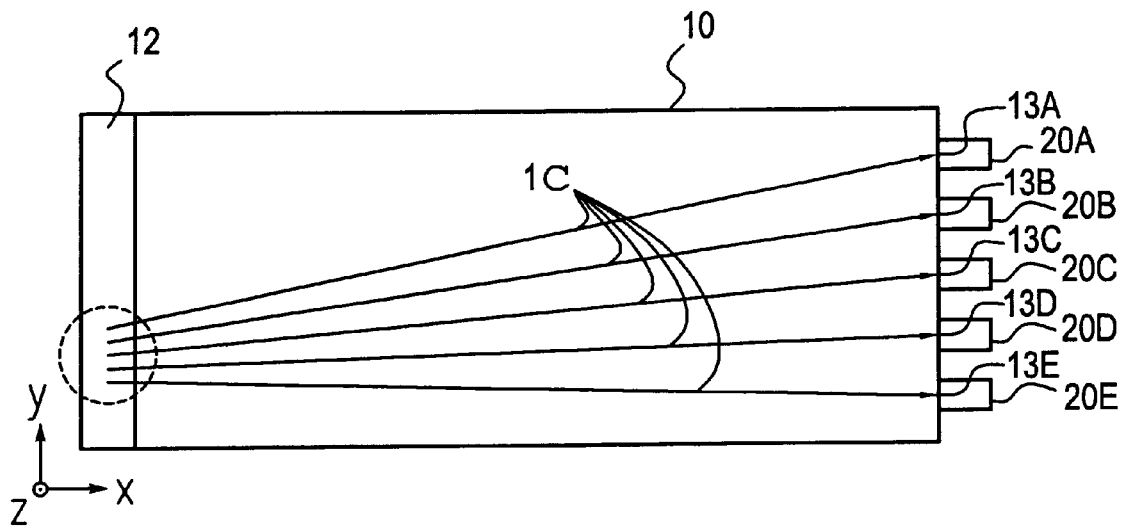
FIG. 1 is a plane view showing typically an optical bus according to a first embodiment of the present invention.
Figure 2:
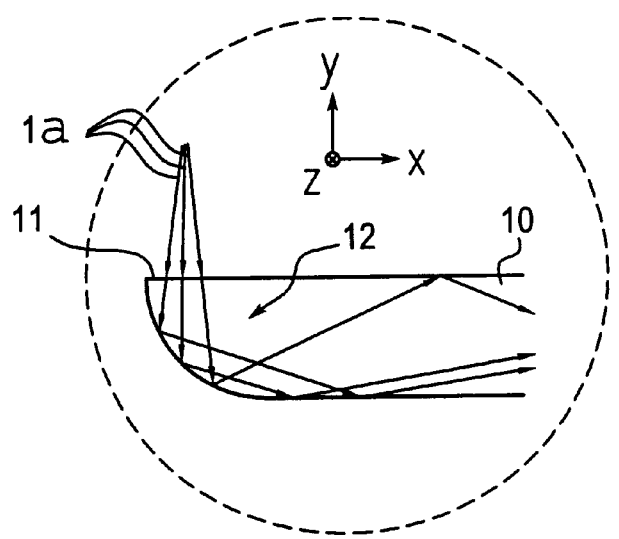
FIG. 2 is an enlarged side view showing typically the beam dividing portion of the first embodiment shown in FIG. 1.
Figure 3:
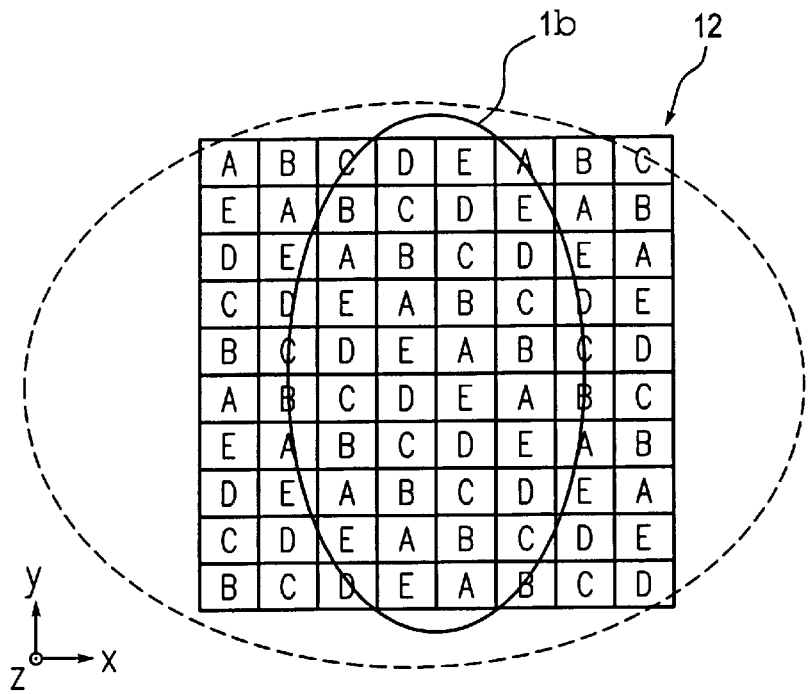
FIG. 3 is an enlarged plan development view showing typically the beam dividing portion of the first embodiment shown in FIG. 1.

FIG. 1 is a plane view showing typically an optical bus according to a first embodiment of the present invention, FIG. 2 is an enlarged side view showing typically a beam dividing portion of the first embodiment shown in FIG. 1, and FIG. 3 is an enlarged plane development view showing typically the beam dividing portion of the embodiment shown in FIG. 1.

The optical bus shown in these figures is a sheet-like optical bus 10, a signal light input portion 11 and a beam dividing portion 12 (see FIG. 2) are formed on a left side part of FIG. 1, and five signal light output portions 13A, 13B, 13C, 13D, 13E are formed on a right side part of FIG. 1. Light receiving elements 20A, 20B, 20C, 20D, 20E are provided at the five signal light output portions 13A, 13B, 13C, 13D, 13E to receive signal light from the signal light output portions 13A, 13B, 13C, 13D, 13E, respectively.

Signal light input into the optical bus 10 from the signal light input portion 11 is shown as three rays 1a having different angles in FIG. 2 and a spot beam 1b in FIG. 3. In this embodiment, this input signal light is a pencil of rays which are diffused in a direction x as shown in FIG. 2 and parallel to each other with a large spot diameter in a direction y as shown in FIG. 3. When the input signal light is a pencil of rays diffused in the direction y as well, the output signal light at the signal output portions 13A, 13B, 13C, 13D, 13E spreads in the direction y and hence, the light receiving elements 20A, 20B, 20C, 20D, 20E must be large in size in the direction y.

Even when the input signal is diffused in the direction x as shown in FIG. 2, there is no problem because it advances in the direction x repeating total reflection within the sheet-like optical bus 10.

The beam dividing portion 12 consists of a plurality of reflection surfaces A, B, C, D, E, each of which is smaller than the spot diameter of the input signal light. The reflection surfaces A, B, C, D, E reflect the input signal light towards the signal light output portions 13A, 13B, 13C, 13D, 13E, respectively. The signal light reflected by a large number of reflection surfaces formed in the beam dividing portion 12 is headed in the optical bus toward the signal light output portions 13A, 13B, 13C, 13D, 13E as shown by five rays 1c in FIG. 1, output from the signal light output portions 13A, 13B, 13C, 13D, 13E, and input and received by the light receiving elements 20A, 20B, 20C, 20D, 20E.

Figure 4:
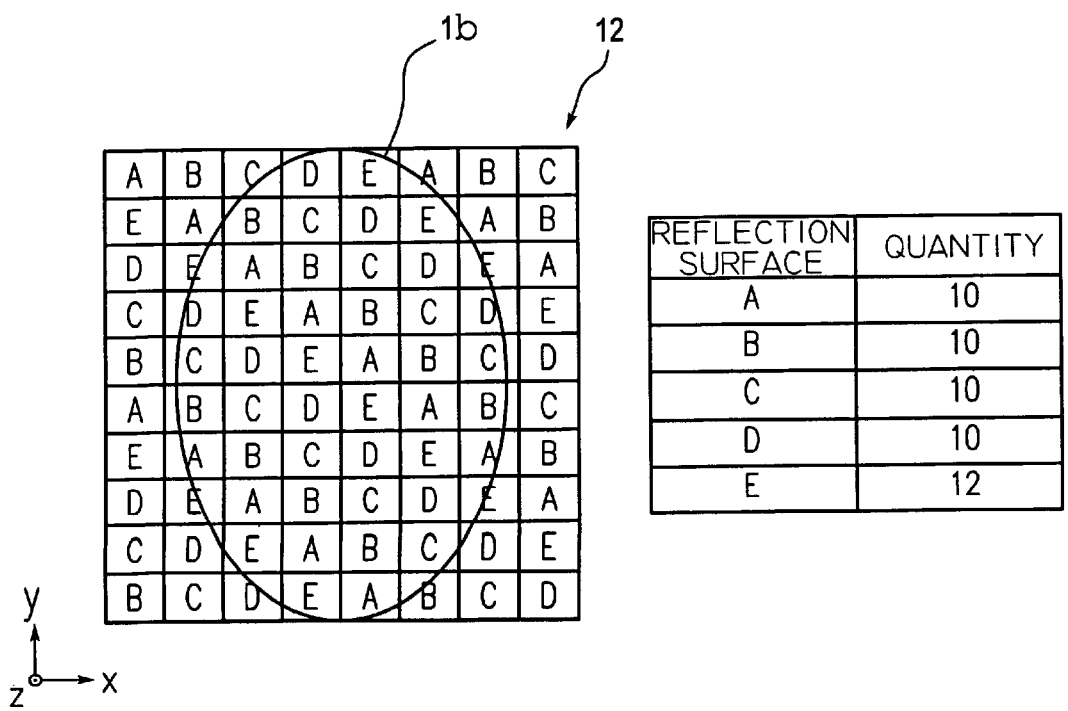
FIG. 4 is a diagram showing typically the relationship between the reflection surfaces of the beam dividing portion and the spot position of input signal light when the input signal light is input without displacement in a direction x.
Figure 5:
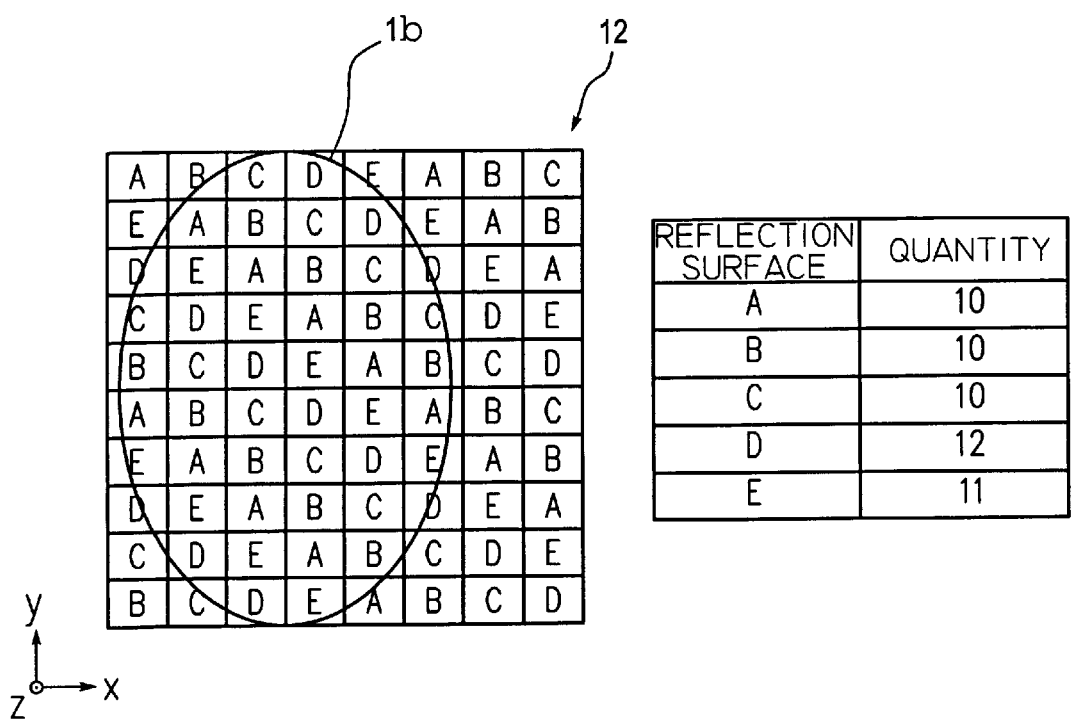
FIG. 5 is a diagram showing typically the relationship between the reflection surfaces of the beam dividing portion and the spot position of input signal light when the input signal light is input with displacement to a negative side in the direction x.
Figure 6:
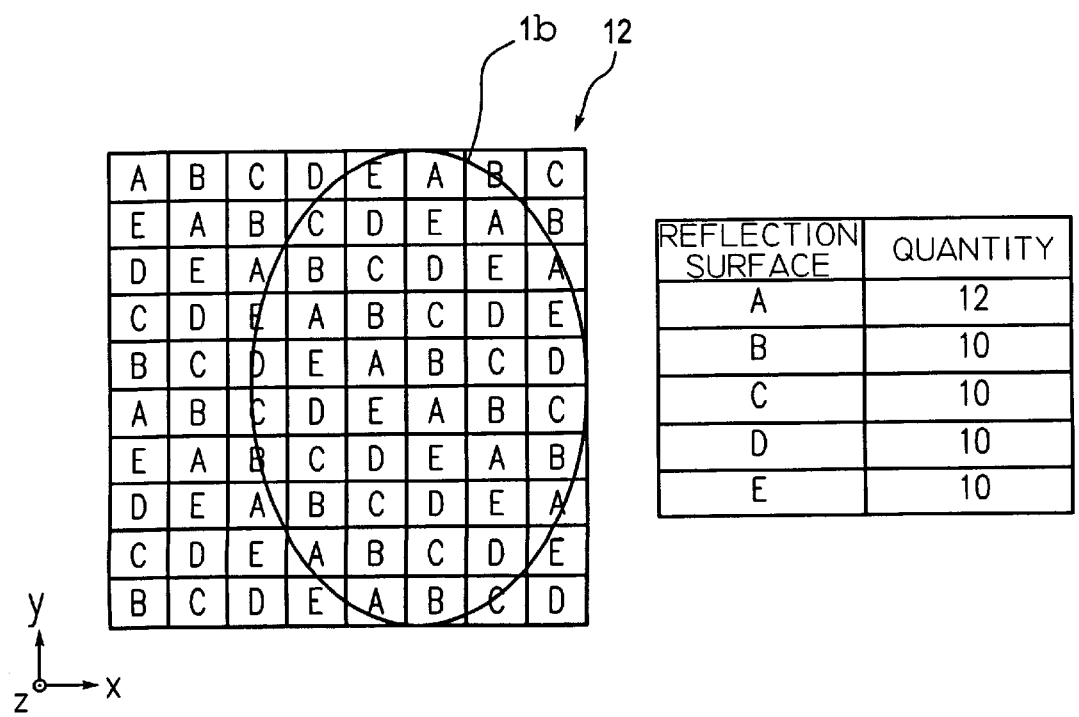
FIG. 6 is a diagram showing typically the relationship between the reflection surfaces of the beam dividing portion and the spot position of input signal light when the input signal light is input with displacement to a positive side in the direction x.

FIG. 4 is a diagram showing typically the relationship between the reflection surfaces of the beam dividing portion and the spot position of the input signal light when the input signal light is input without displacement in the direction x. FIG. 5 is a diagram showing typically the relationship between the reflection surfaces of the beam dividing portion and the spot position of the input signal light when the input signal light is input with displacement to a negative side in the direction x. FIG. 6 is a diagram showing typically the relationship between the reflection surfaces of the beam dividing portion and the spot position of the input signal light when the input signal light is input with displacement to a positive side in the direction x.

As the number of the reflection surfaces A to E for reflecting the signal light toward the signal light output portions 13A to 13E and included in the spot beam 1b is shown in each of the above diagrams, the number of the reflection surfaces A to E is 10 to 12 in all of the diagrams in this embodiment. Even when the input signal light is input with displacement, a change in the amount of light received by the light receiving elements 20A to 20E is small and signal light having almost the same intensity can be received.

Figure 7:
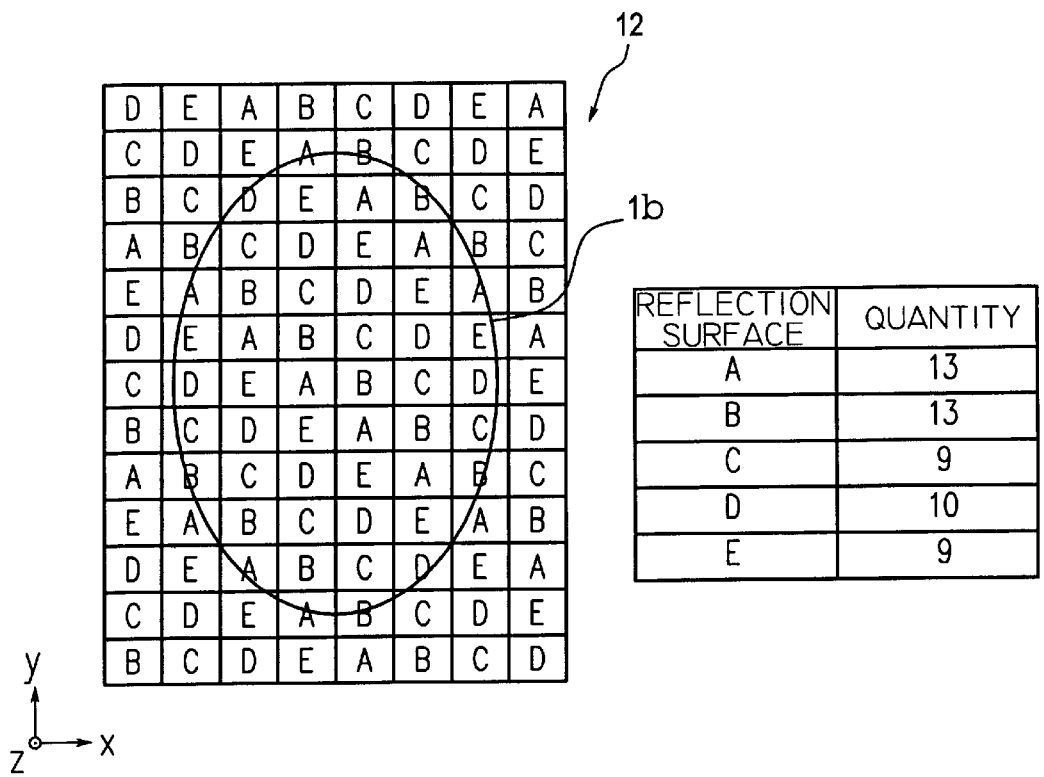
FIG. 7 is a diagram showing typically the relationship between the reflection surfaces of the beam dividing portion and the spot position of input signal light when the input signal light is input without displacement in a direction y.
Figure 8:
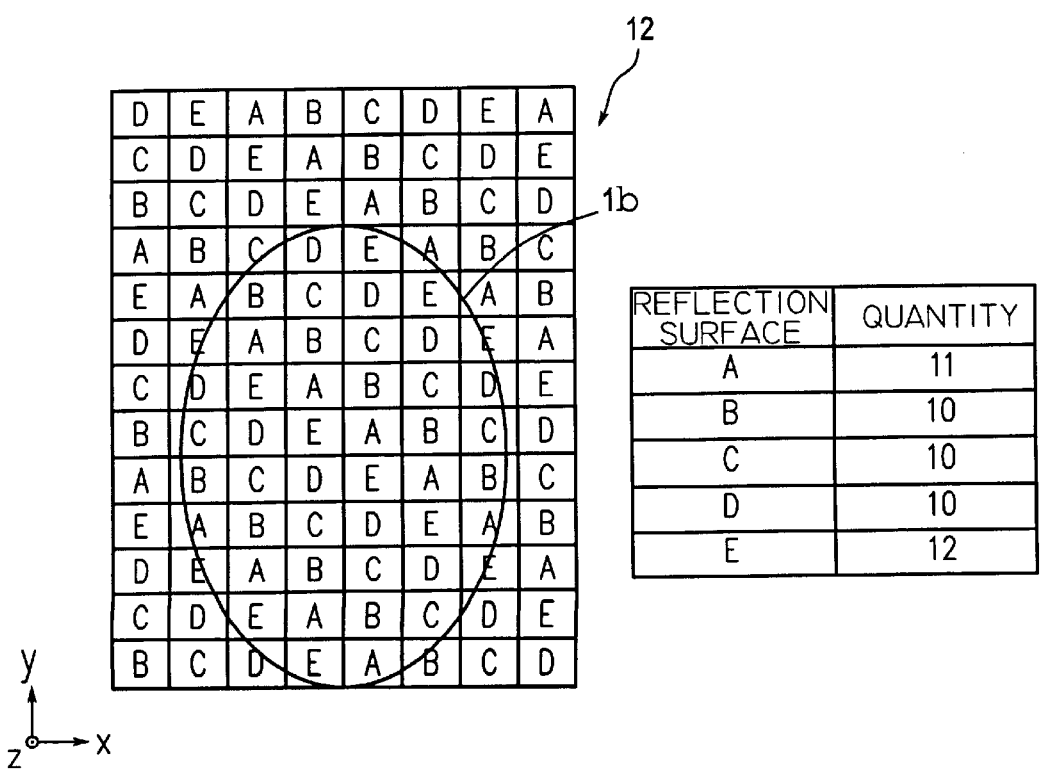
FIG. 8 is a diagram showing typically the relationship between the reflection surfaces of the beam dividing portion and the spot position of input signal light when the input signal light is input with displacement to a negative side in the direction y.
Figure 9:
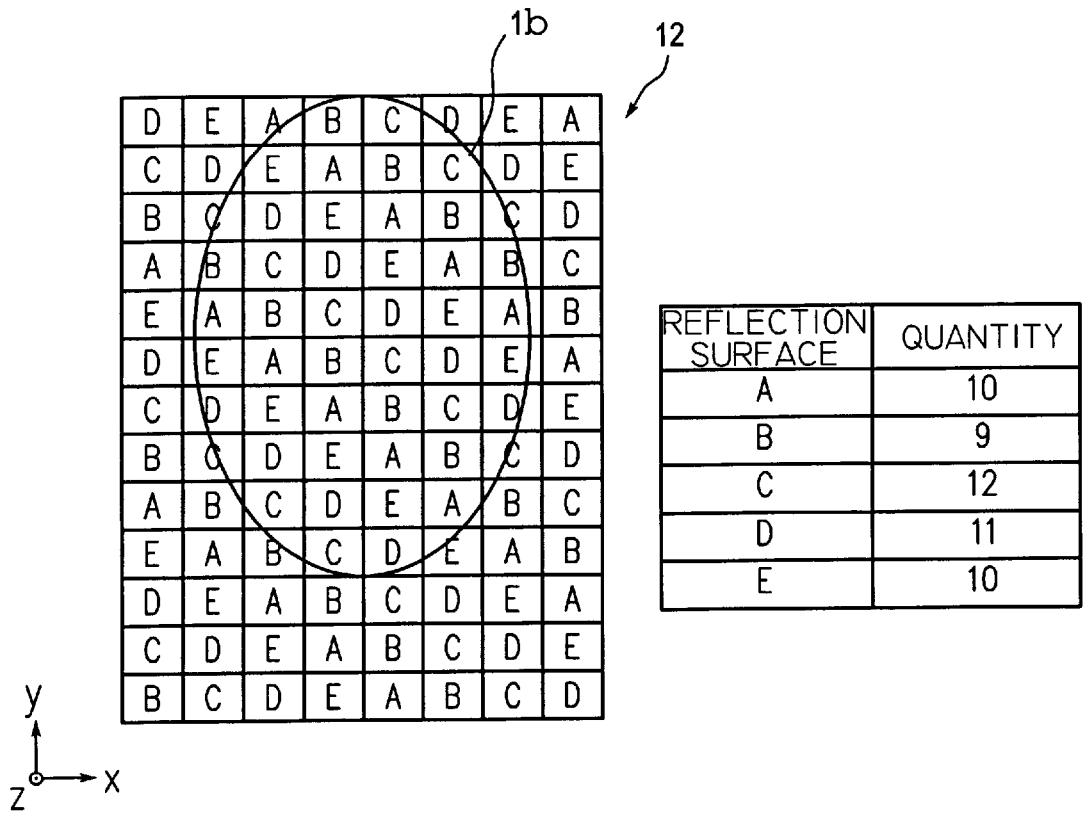
FIG. 9 is a diagram showing typically the relationship between the reflection surfaces of the beam dividing portion and the spot position of input signal light when the input signal light is input with displacement to a positive side in the direction y.

FIG. 7 is a diagram showing typically the relationship between the reflection surfaces of the beam dividing portion and the spot position of the input signal light when the input signal light is input without displacement in the direction y. FIG. 8 is a diagram showing typically the relationship between the reflection surfaces of the beam dividing portion and the spot position of the input signal light when the input signal light is input with displacement to a negative side in the direction y. FIG. 9 is a diagram showing typically the relationship between the reflection surfaces of the beam dividing portion and the spot position of the input signal light when the input signal light is input with displacement to a positive side in the direction y.

In this example, even when the input signal light is displaced in the direction y, it is included in the spot beam 1b of the input signal light. The number of the reflection surfaces A to E for reflecting the input signal light toward the signal light output portions 13A to 13E is 9 to 13 and a change in the amount of signal light directing toward the signal light output portions 13A to 13E is small. Some countermeasure against the angular displacement in the direction y of the input signal light is necessary as described hereinafter.

Figure 10:
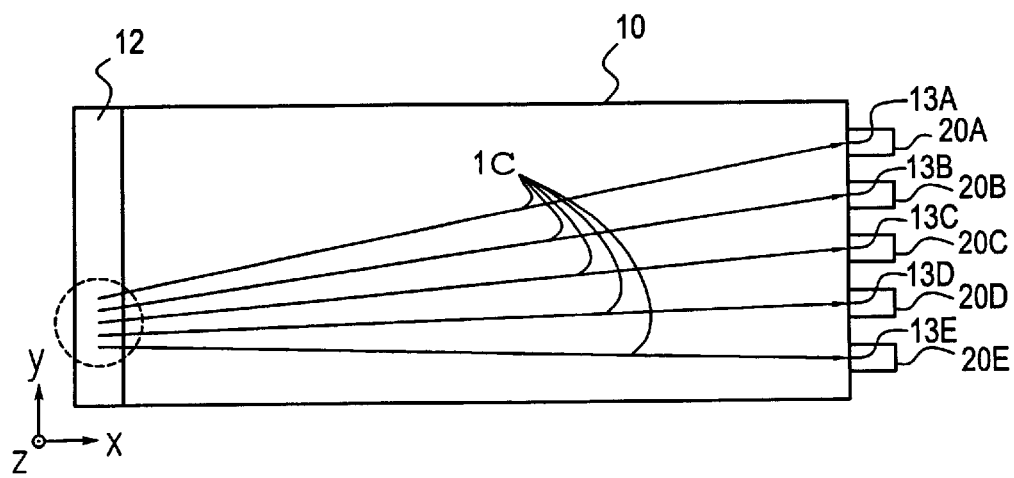
FIG. 10 is a diagram showing typically rays reflected by the reflection surfaces of the beam dividing portion when input signal light is input without angular displacement in the direction y.
Figure 11:
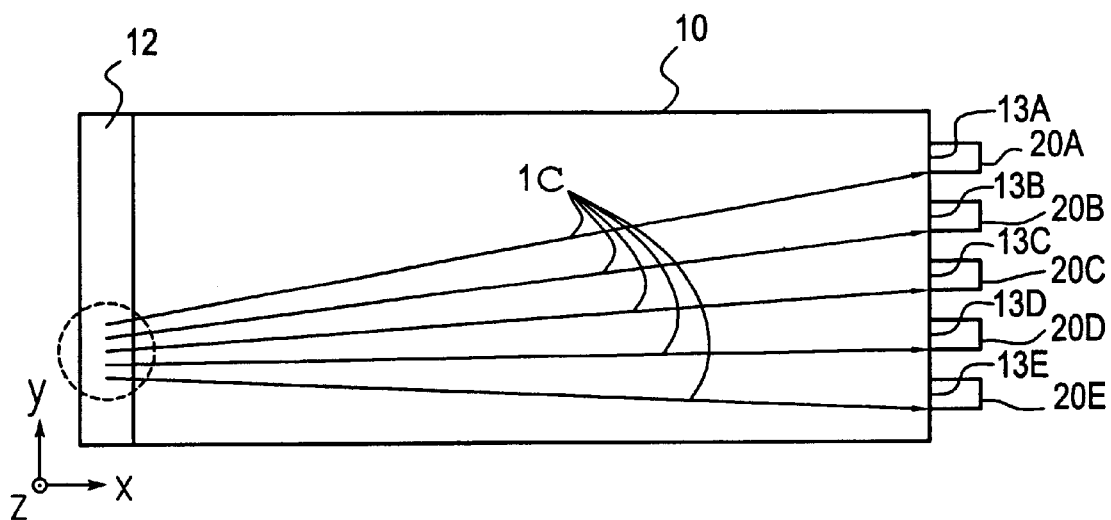
FIG. 11 is a diagram showing typically rays reflected by the reflection surfaces of the beam dividing portion when input signal light is input with angular displacement to a negative side in the direction y.
Figure 12:
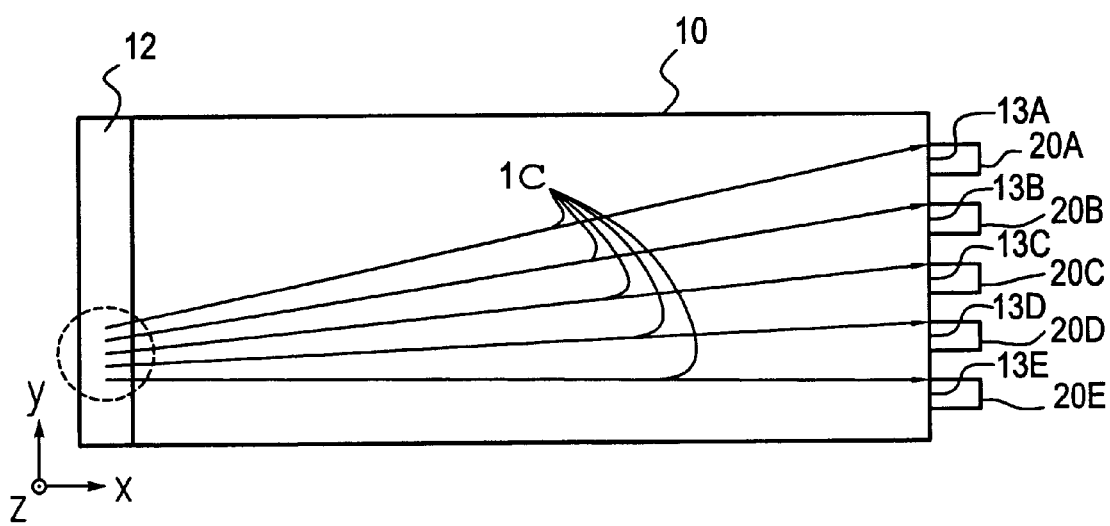
FIG. 12 is a diagram showing typically rays reflected by the reflection surfaces of the beam dividing portion when input signal light is input with angular displacement to a positive side in the direction y.

FIG. 10, FIG. 11 and FIG. 12 show rays reflected by the reflection surfaces of the beam dividing portion when the input signal light is input without angular displacement in the direction y, when the input signal light is input with angular displacement to a negative side in the direction y, and when the input signal is input with angular displacement to a positive side in the direction y.

When the input signal light is input with angular displacement in the direction y, as shown in FIG. 11 and FIG. 12, the signal light is displaced in the direction y at the signal light output portions 13A to 13E. However, in this embodiment, limitations in the direction x are extremely loose and the position and angle of the input signal light with respect to only the direction y can be limited relatively easily with the current packaging technology. Or the signal light can be input into the light receiving elements 20A to 20E even with slight displacement in the direction y by forming the signal light output portions 13A to 13E like a lens.

Figure 13:
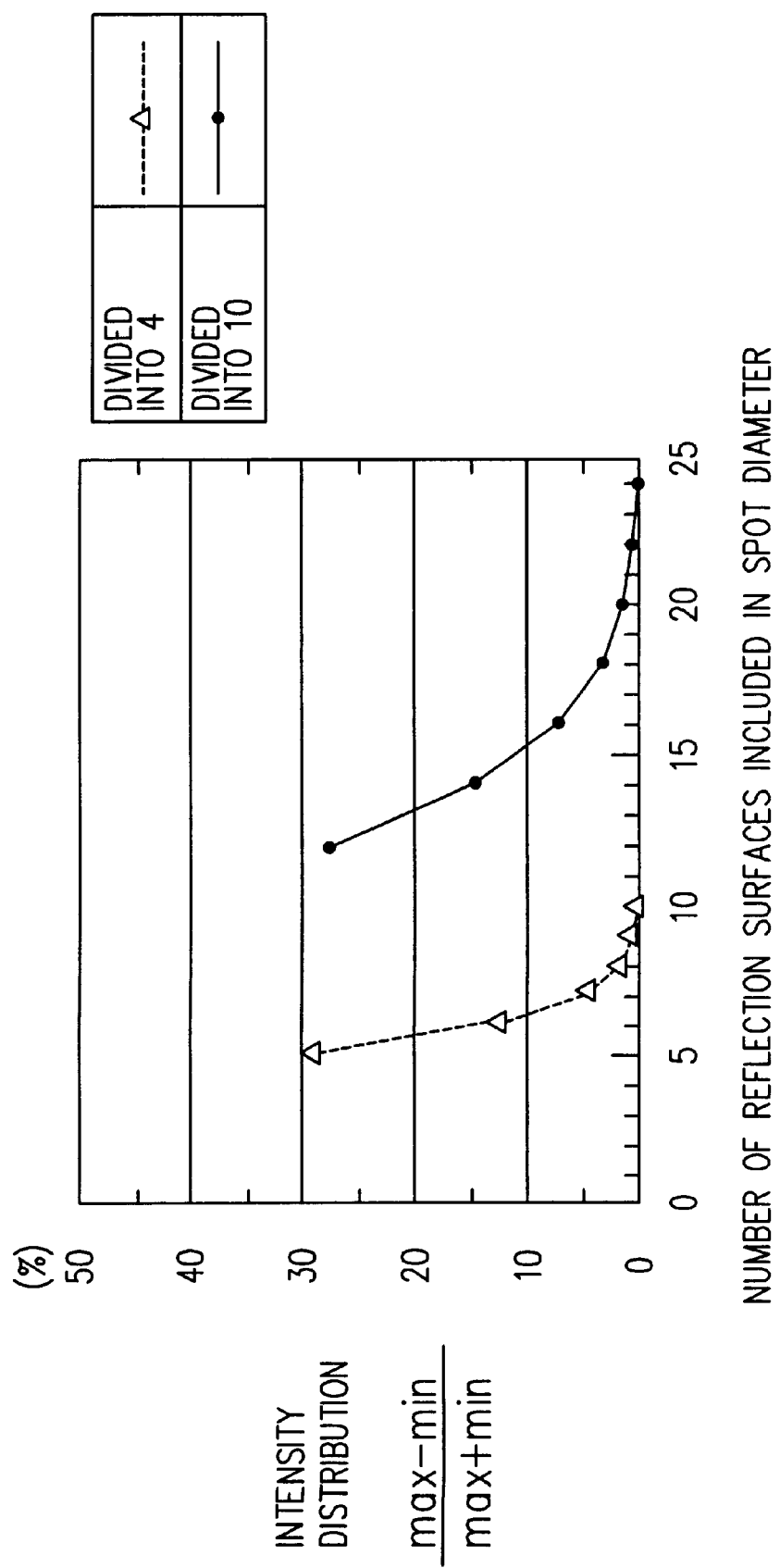
FIG. 13 is a diagram showing the simulation results of the intensity of signal light directing toward signal light output portions with respect to the number of reflection surfaces, included in the spot diameter of the input signal light, of the beam dividing portion.

FIG. 13 is a diagram showing the simulation results of the intensity of signal light headed toward the signal light output portions with respect to the number of reflection surfaces included in the spot diameter of the input signal light of the beam dividing portion. In this figure, an intensity distribution within the spot of the input signal light is supposed to be a Gaussian distribution and a portion within an outline drawn by points where the intensity is reduced from the center intensity to $1/e^2$ is taken as a spot area. This figure shows the case where the number of signal light output portions is 4 (the input signal light is divided into 4 rays and the 4 rays are directed toward the four signal light output portions) and the case where the number of signal light output portions is 10. When the maximum intensity out of the intensities of signal rays headed toward the 4 or 10 signal light output portions is represented by max and the minimum intensity is represented by min, an intensity distribution is obtained from (max−min)/(max+min). The reflection surfaces facing different directions are arranged cyclically as shown in FIG. 3.

As is understood from FIG. 13, when the signal light is divided into 4 (4 signal light output portions), if the number of reflection surfaces included in the spot diameter is 7 or more, an intensity distribution can be controlled to about 5% or less and when the signal light is divided into 10 (10 signal light output portions), if the number of reflection surfaces included in the spot diameter is 16 or more, an intensity distribution can be controlled to about 7% or less.

Thus, a uniform intensity distribution having no practical problem can be obtained with a relatively small number of reflection surfaces.

Figure 14:
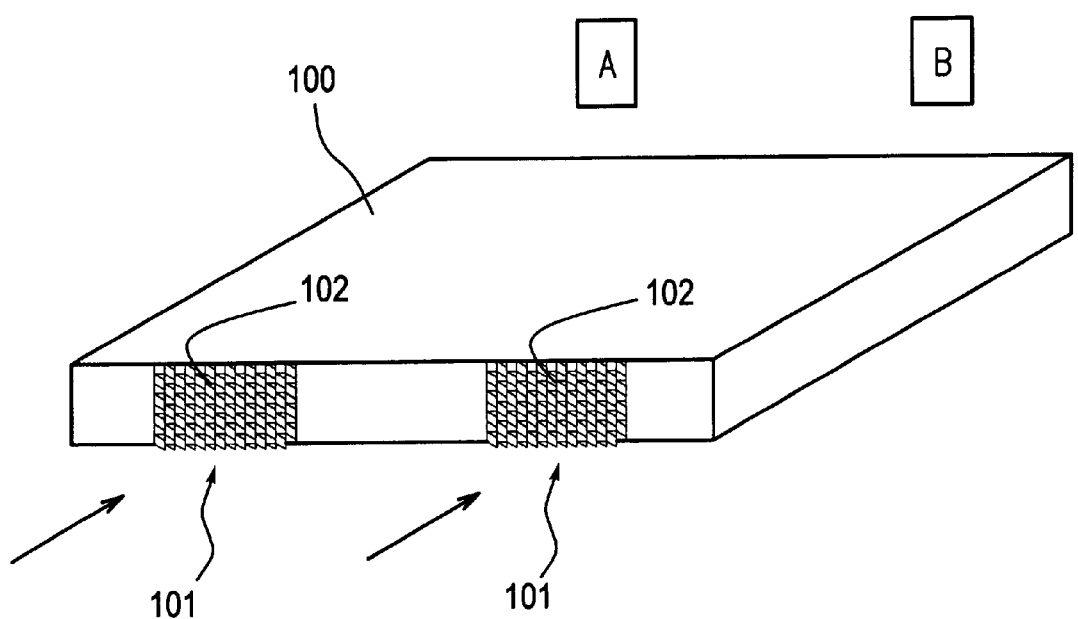
FIG. 14 is a perspective view of an optical bus according to a second embodiment of the present invention.
Figure 15:
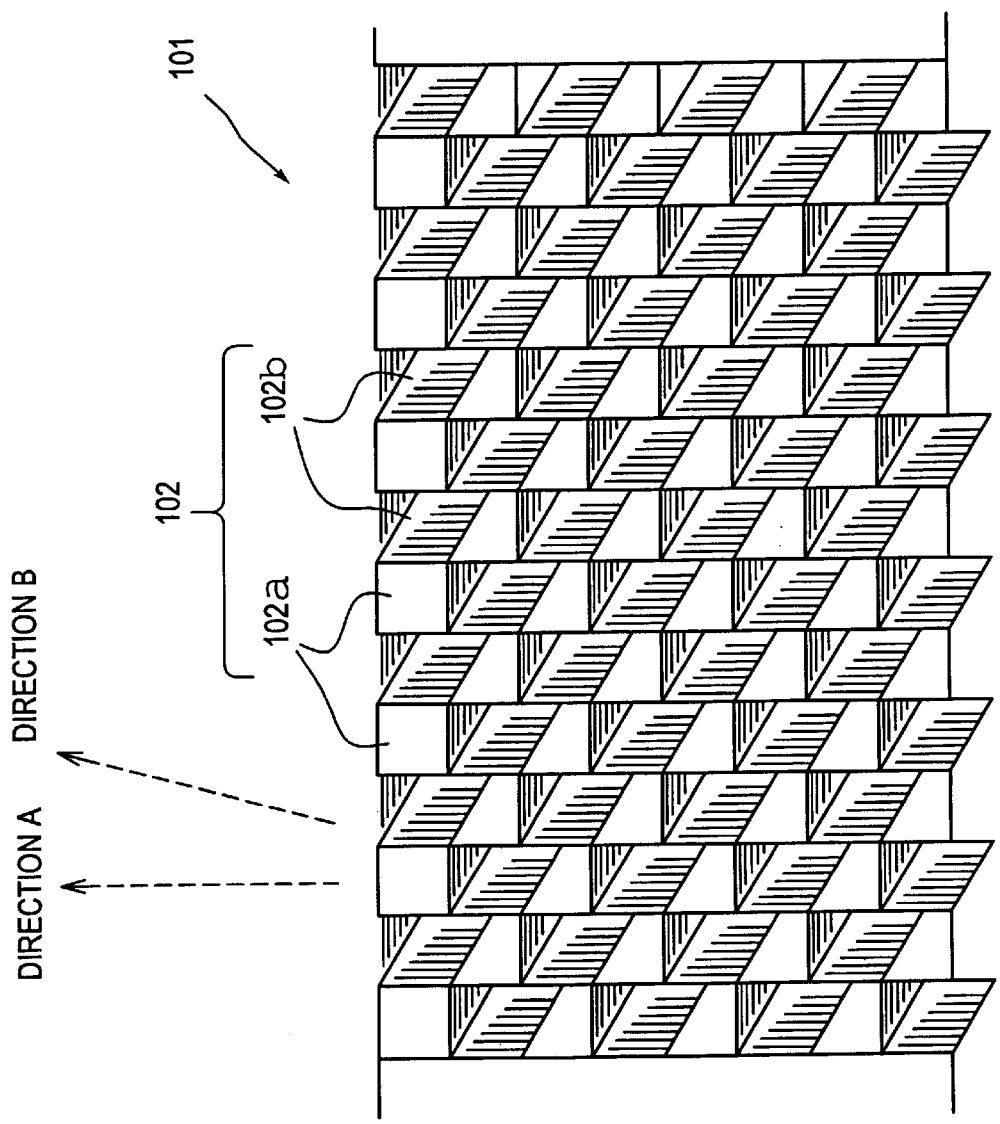
FIG. 15 is a partially enlarged view of a signal light input portion and beam dividing portion of the optical bus shown in FIG. 14.

FIG. 14 is a perspective view of an optical bus according to a second embodiment of the present invention, and FIG. 15 is a partially enlarged view of a signal light input portion and beam dividing portion of the optical bus shown in FIG. 14. For viewing ease, FIG. 14 is enlarged in a thickness direction.

An optical bus 100 shown in FIG. 14 comprises two signal light input portions 101 for receiving signal light on an end surface on this side of FIG. 14 of the optical bus 100. A large number of refraction surfaces 102a, 102b (see FIG. 15) constituting a beam dividing portion 102 are formed in each of the signal light input portions 101. In this embodiment, signal light is input from the end surface of the optical bus.

The optical bus 100 shown in FIG. 14 has two signal light output portions on an end surface on the other side of FIG. 14. In FIG. 14, the locations of the two signal light output portions are indicated by A, B. Unshown light receiving elements are disposed on each of the two signal light output portions so that signal light output from the signal light output portions is received by the light receiving elements.

Out of a large number of refraction surfaces 102a, 102b shown in FIG. 15, the refraction surfaces 102a refract the input signal light toward the signal light output portion at a location A out of the two signal light output portions and input it into the optical bus, and the refraction surfaces 102b refract the input signal light toward the signal light output portion at a location B out of the two signal light output portions and input it into the optical bus. The optical bus of this embodiment has two signal light output portions. However, by forming refraction surfaces having a larger number of different angles in the beam dividing portion 102, the input signal light can be refracted toward a larger number of signal light output portions.

Figure 16:
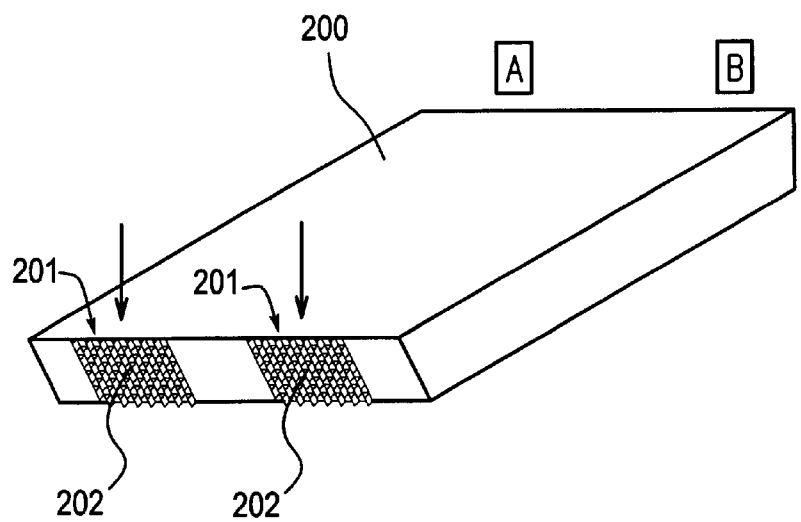
FIG. 16 is a perspective view of an optical bus according to a third embodiment of the present invention.
Figure 17:
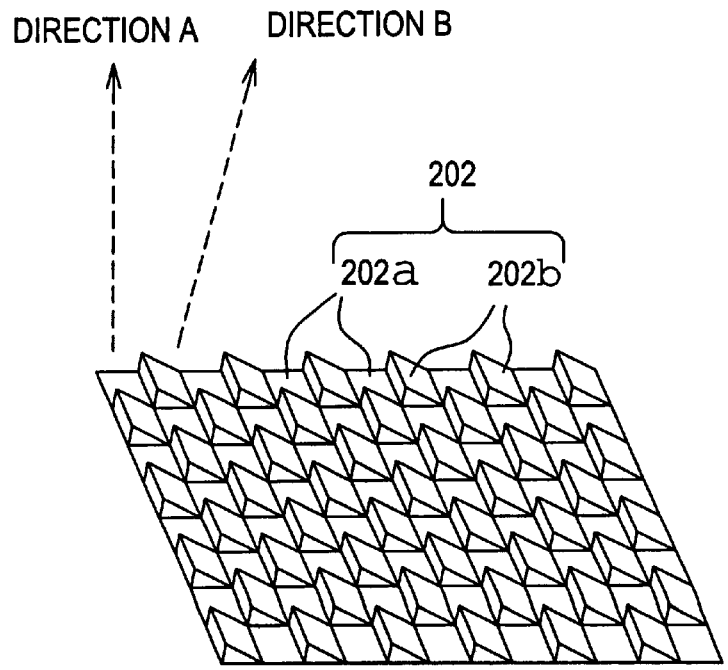
FIG. 17 is a partially enlarged view of the beam dividing portion of the optical bus shown in FIG. 16.

FIG. 16 is a perspective view of an optical bus according to a third embodiment of the present invention. FIG. 17 is a partially enlarged view of the beam dividing portion of the optical bus shown in FIG. 16. In FIG. 16, the beam dividing portion is enlarged in a thickness direction like FIG. 14.

An optical bus 200 shown in FIG. 16 has an end surface shown on this side of FIG. 16 formed in such a manner that it faces obliquely downward and the beam dividing portion 202 is formed on the end surface facing obliquely downward at two locations. On an end surface on the other side of FIG. 16, signal light output portions are formed at locations A and B like the embodiment shown in FIG. 14.

Many reflection surfaces 202a, 202b are formed in the beam dividing portion 202 as shown in FIG. 17. The reflection surfaces 202a which are half of the reflection surfaces 202a, 202b reflect the input signal light toward the signal light output portion at a location A out of the two signal light output portions, and the reflection surfaces 202b of the remaining half reflect the input signal light toward the signal light output portion at a location B out of the two signal light output portions.

The optical bus of the embodiment shown in FIG. 16 and FIG. 17 also has two signal light output portions like the embodiment shown in FIG. 14 and FIG. 15. By forming reflection surfaces having a larger number of different angles in the beam dividing portion 202, the input signal light can be reflected toward a larger number of signal light output portions.

Figure 18:
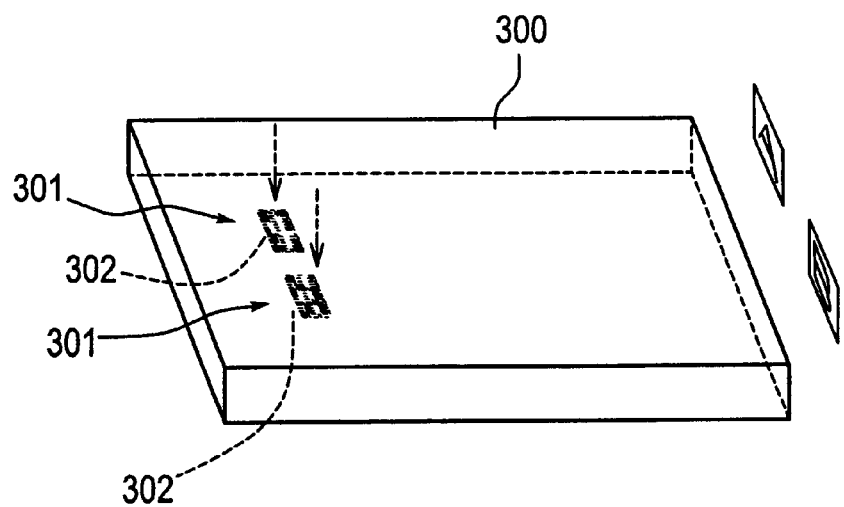
FIG. 18 is a perspective view of an optical bus according to a fourth embodiment of the present invention.
Figure 19:
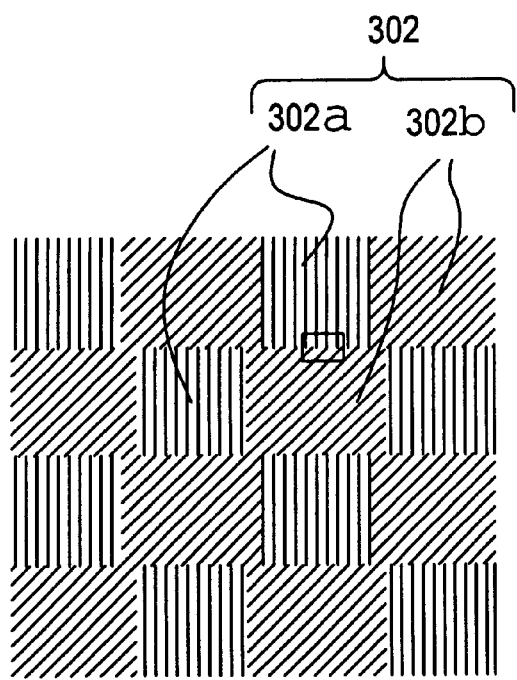
FIG. 19 is a partially enlarged view of the beam dividing portion of the optical bus shown in FIG. 18.
Figure 20:
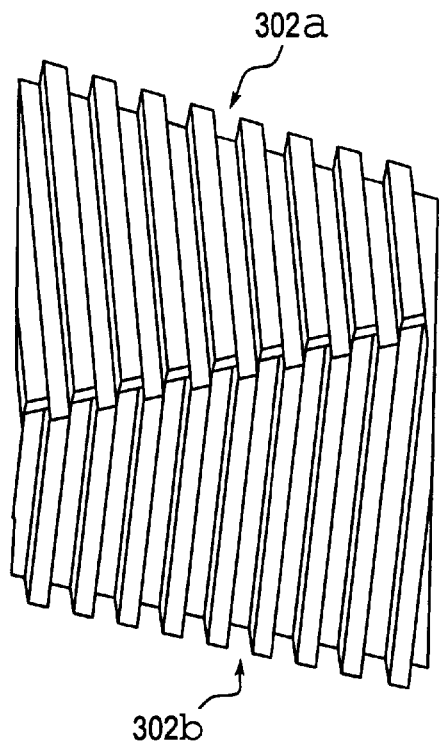
FIG. 20 is a partially enlarged view of a part of the beam dividing portion shown in FIG. 19.

FIG. 18 is a perspective view of an optical bus according to a fourth embodiment of the present invention, FIG. 19 is a partially enlarged view of the beam dividing portion of the optical bus shown in FIG. 18, and FIG. 20 is a partially enlarged view of a part of the beam dividing portion shown in FIG. 19. FIG. 18 is enlarged in a thickness direction.

Two beam branching portions 302 are formed on an under surface of an optical bus 30 shown in FIG. 18 and two signal light output portions are formed on an end surface on a right side part of FIG. 18 at locations A and B.

As shown in FIG. 19 and FIG. 20, reflection type diffraction surfaces 302a, 302b facing different directions are formed in the beam dividing portion 302 alternately. The reflection surfaces 302a which are half of the plurality of diffraction surfaces 302a, 302b reflect and diffract the input signal light such that the diffracted input signal light converges at a location A and the reflection surfaces 302b of the remaining half reflect and diffract the input signal light such that the diffracted input signal light converges at a location B.

The optical bus of the embodiment shown in FIGS. 18 to 20 has two signal light output portions. By forming diffraction surfaces diffracting signal light toward a larger number of directions in the beam dividing portion 302, the input signal light can be reflected and diffracted toward a larger number of signal light output portions.

Although the optical bus of this embodiment comprises reflection and diffraction surfaces, transmission diffraction surfaces may be formed in the signal light input portion in the embodiment shown in FIG. 14, for example, to transmit and diffract the input signal light so that it converges at a plurality of signal light output portions.

Figure 21:
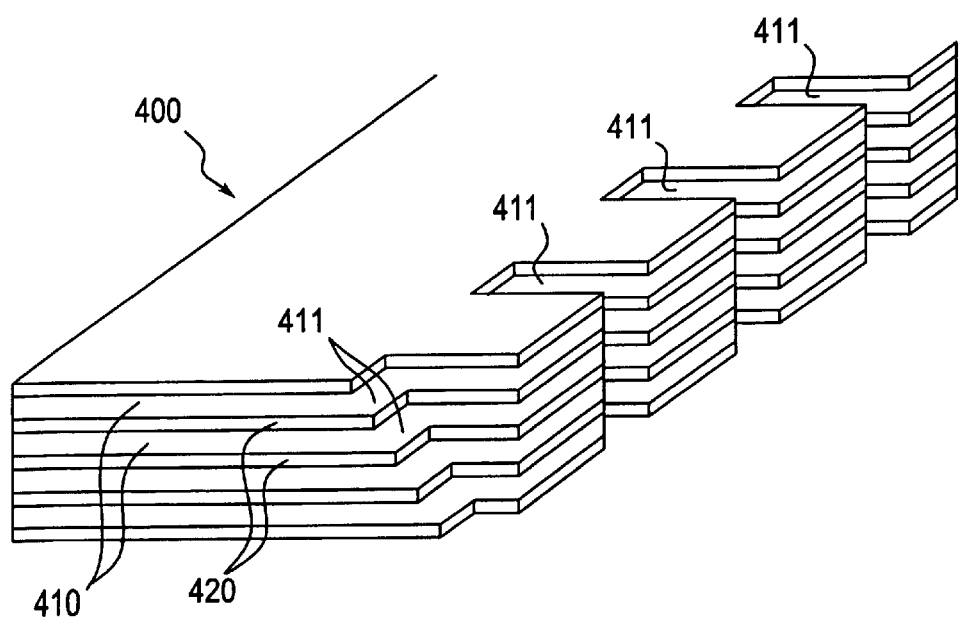
FIG. 21 is perspective view of an optical bus according to a fifth embodiment of the present invention.

FIG. 21 is a perspective view of an optical bus according to a fifth embodiment of the present invention. The optical buses of the previous embodiments are all one-layer sheet-like optical buses. An optical bus 400 shown in FIG. 21 has a laminate structure consisting of a plurality of core layers 410 for transmitting signal light and a plurality of clad layers 420 for separating the core layers 410 from one another, all of which are laminated alternately.

A right side portion shown in FIG. 21 of the optical bus 400 has a stepped structure and a signal light input portion 411 for inputting signal light into each of the core layers 410 is formed in the stepped portion. Each of the signal light input portions 411 receives signal light input from an upper part of FIG. 21. A beam dividing portion (not shown in FIG. 21) consisting of reflection and diffraction surfaces as shown in FIGS. 19 and 20 is formed on an under surface of each of the core layers 410. When signal light is input into any one of the signal input portions 411, the input signal light is divided and directed toward a plurality of signal light output portions, not shown, formed on an end surface on an left side part of FIG. 21 of the optical bus 400 and propagates within the core layer.

As shown in this embodiment, the bus of the present invention may have a laminate structure consisting of a plurality of layers.

Figure 22:
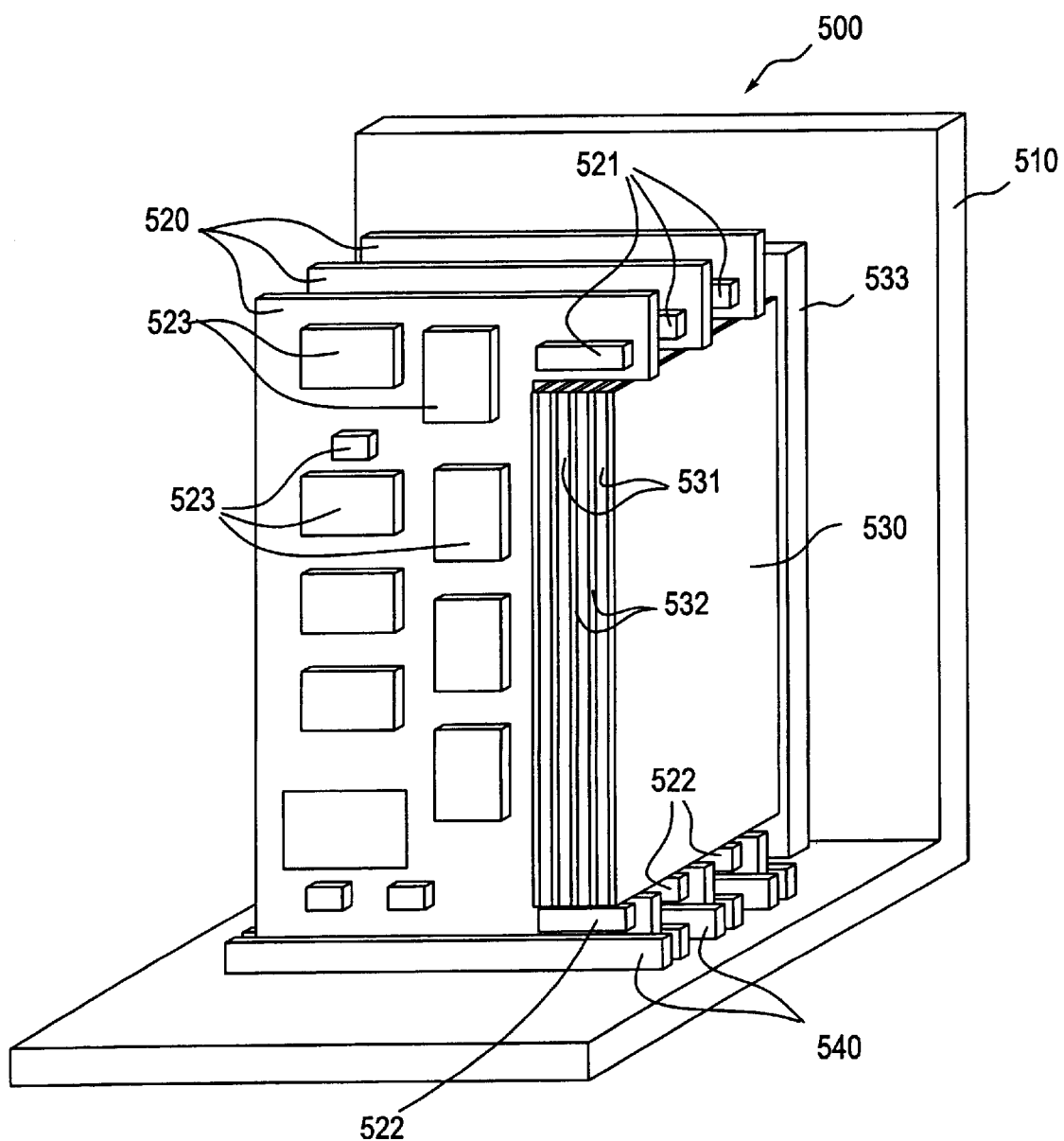
FIG. 22 is a perspective view showing typically a signal processor according to an embodiment of the present invention.

FIG. 22 is a perspective view showing typically a signal processor according to an embodiment of the present invention.

The signal processor 500 shown in FIG. 22 comprises a substrate 510, circuit boards 520, an optical bus 530 and circuit board connectors 540.

The optical bus 530 is a laminate structure which consists of a plurality of core layers 531 and a plurality of clad layers 532 laminated alternately, and is arranged vertically and fixed to the vertical wall of the L-shaped substrate 510 by an optical bus fixing tool 533.

The signal processor 500 comprises a plurality of circuit boards 520, each of which is detachably connected to each circuit board connector 540. Each circuit board 520 comprises a light emitting portion 521 (corresponding to "signal light output end" in the present invention) to which light emitting elements are fixed at locations corresponding to the signal light input portions on upper end surfaces of the core layers 531 of the optical bus when connected to the circuit board connector 540. Each circuit board 520 comprises a light receiving portion 522 (corresponding to "signal light input end" in the present invention) to which light receiving elements are fixed at locations corresponding to the signal light output portions on lower end surfaces of the core layers 531. Further, electronic circuit components 523 for generating a signal to be carried by the signal light output from the light emitting portion 521 and carrying out signal processing based on the signal carried by the signal light received by the light receiving portion 522 are mounted on each of the circuit boards 520. These electronic circuit components 523 are supplied with power through the circuit board connectors 540 (power lines are not shown).

A beam dividing portion consisting of a plurality of refraction surfaces as shown in FIG. 14 and FIG. 15, for example, is formed in the signal light input portion, facing the light emitting portion 521, of each core layer 531 of the optical bus 530. Even signal light output from the light emitting portion 521 of any circuit board out of the plurality of circuit boards 520 and input into the optical bus 530 is transmitted to the plurality of signal light output portions, facing the light receiving portions 522 of all the plurality of circuit boards 520, of the optical bus 530 and input into the light receiving portions 522 of all the plurality of circuit boards.

Since the signal processor shown in FIG. 22 transmits signal light input into the optical bus only to the plurality of signal light output portions, an optical energy loss is small, power consumption can be thereby reduced, and the system can be changed flexibly by attaching and detaching circuit boards.

FIG. 22 shows an example of the signal processor which employs an optical bus comprising a signal light input portion on an end surface. The signal processor of the present invention can employ the optical bus of any one of the above embodiments of the present invention.

As described above, according to the present invention, there are provided an optical bus which has not so high positioning accuracy and high energy transmission efficiency and a signal processor which has high system extendability and low power consumption.

Variations to the preferred embodiments which have been described heretofore, will occur to those skilled in the art within the scope of the present inventive concepts which are delineated by the following claims.

What is claimed is:

1. An optical bus for propagating signal light, comprising:
   a signal light input portion that inputs the signal light;
   a plurality of signal light output portions that outputs rays of the signal light; and a beam dividing portion that divides the signal light input from said signal light input portion into a plurality of rays directed substantially only toward said plurality of signal light output portions without regard to a frequency of the signal light.

2. The optical bus of claim 1, wherein said beam dividing portion consists of a plurality of unit optical elements, each for directing the signal light input from said signal light input portion toward any one of said plurality of signal light output portions and divides the signal light input from said signal light input portion into a plurality of rays spatially and directs them toward said plurality of signal light output portions as a whole.

3. The optical bus of claim 2, wherein said beam dividing portion consists of a plurality of unit optical elements for directing the signal light input from said signal light input portion toward different signal light output portions out of said plurality of signal light output portions, which are arranged adjacent to one another.

4. The optical bus of claim 3, wherein said beam dividing portion consists of reflection bodies, each for reflecting the signal light input from said signal light input portion and directing it toward any one of said plurality of signal light output portions, as the unit optical elements.

5. The optical bus of claim 3, wherein said beam dividing portion consists of refraction bodies, each for refracting the signal light input from said signal light input portion and directing it toward any one of said plurality of signal light output portions, as the unit optical elements.

6. The optical bus of claim 3, wherein said beam dividing portion consists of diffraction bodies, each for diffracting the signal light input from said signal light input portion and directing it toward any one of said plurality of signal light output portions, as the unit optical elements.

7. A signal processor comprising:

a substrate;

a plurality of circuit boards, at least one circuit board having at least one signal-light-input-end that inputs a first signal light, an electronic circuit for carrying out signal processing based on the first signal light and at least one signal-light-output-end that outputs a second signal light generated by the electronic circuit; and an optical bus, fixed to the substrate, having a signal light input portion that outputs the second signal light, a plurality of signal light output portions that outputs rays of the second signal light, and a beam dividing portion that divides the second signal light input from said signal light input portion into a plurality of rays directed substantially only toward said plurality of signal light output portions without regard to a frequency of the signal light; and circuit board bases for fixing said circuit boards to said substrate in such a manner that the at least one signal-light-output-end of the at least one circuit board is optically coupled to said signal light input portion of said optical bus and the at least one signal-light-input-end of the at least one circuit board is optically coupled to one of said plurality of signal light output portions of said optical bus.

8. The optical signal processor of claim 7, wherein said beam dividing portion of said optical bus consists of a plurality of unit optical elements, each for directing the signal light input from said signal light input portion of said optical bus toward any one of said plurality of signal light output portions of said optical bus and divides the signal light input from said signal light input portion of said optical bus into a plurality of rays spatially and directs them toward said plurality of signal light output portions of said optical bus as a whole.

9. The optical signal processor of claim 8, wherein said beam dividing portion of said optical bus consists of a plurality of unit optical elements for directing the signal light input from said signal light input portion of said optical bus toward different signal light output portions out of said plurality of signal light output portions of said optical bus, which are arranged adjacent to one another.

10. The optical signal processor of claim 9, wherein said beam dividing portion of said optical bus consists of a plurality of reflection bodies, each for reflecting the signal light input from said signal light input portion of said optical bus and directing it toward any one of said plurality of signal light output portions of said optical bus, as the unit optical elements.

11. The signal processor of claim 9, wherein said beam dividing portion of said optical bus consists of refraction bodies, each for refracting the signal light input from said signal light input portion of said optical bus and directing it toward any one of said plurality of signal light output portions of said optical bus, as the unit optical elements.

12. The signal processor of claim 9, wherein said beam dividing portion of said optical bus consists of diffraction bodies, each for diffracting the signal light input from said signal light input portion of said optical bus and directing it toward any one of said plurality of signal light output portions of said optical bus, as the unit optical elements.

* * * * *